(12) United States Patent
Brasen et al.

(10) Patent No.: US 7,230,763 B2
(45) Date of Patent: **\*Jun. 12, 2007**

(54) POLARIZING BEAMSPLITTER

(75) Inventors: Gernot Brasen, Mainz (DE); Christian Laue, Mainz (DE); Matthias Loeffler, Eisenberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/426,557

(22) Filed: Jun. 26, 2006

(65) Prior Publication Data

US 2006/0268422 A1    Nov. 30, 2006

Related U.S. Application Data

(63) Continuation of application No. 10/970,952, filed on Oct. 22, 2004, now Pat. No. 7,167,311.

(51) Int. Cl.
*G02B 27/10* (2006.01)

(52) U.S. Cl. ............... 359/618; 359/629; 359/640; 359/496

(58) Field of Classification Search ........ 359/618–622, 359/629, 630, 639–641, 494, 496
See application file for complete search history.

(56) References Cited

U.S. PATENT DOCUMENTS 6,639,921 B1 * 10/2003 Fukumoto ............... 372/20
2002/0089745 A1 * 7/2002 Huang et al. ............ 359/484

* cited by examiner

*Primary Examiner*—Huy Mai
(74) *Attorney, Agent, or Firm*—Zilka-Kotab, PC

(57) ABSTRACT

A polarizing beamsplitter is provided, comprising two wedge-shaped prisms of a birefringent material, the prisms forming a plan-parallel plate, wherein an incident light beam is separated into two partial beams being arranged parallel to the incident beam when emerging from the beamsplitter, the partial beams having a lateral distance with respect to each other, which is continuously changeable.

10 Claims, 7 Drawing Sheets

POLARIZING BEAMSPLITTER

RELATED APPLICATIONS

This application is a continuation of U.S. patent application Ser. No. 10/970,952, filed Oct. 22, 2004 now U.S. Pat. No. 7,167,311, which claims priority to European Patent Application No. 02009572.5, filed Apr. 26, 2002 and German Patent Application No. PCT/EP03/03259, filed Mar. 28, 2003.

FIELD OF THE INVENTION

The present invention relates to a beamsplitters, and more particularly, this invention relates to polarizing beamsplitters.

BACKGROUND OF THE INVENTION

Polarizers are important optical components used in polarizing optics to produce the state of linear polarization.

Beamsplitters for amplitude division of an incident light beam, based on the use of birefringent materials, are known in the art. In general, two principals structural shapes are used.

The beamsplitter prisms according to Wollaston, Sernamont or Rochon separate a light beam after its entry into the crystal under a fixed, constant split angle. The Wollaston prism consists of two calcite prisms which are cemented together on their base. Their crystallographic-optical axes lie perpendicular to each other and perpendicular to the direction of propagation of the incident light. Light striking the surface of incidence at right angles is refracted in the first prism into an ordinary (o) and an extraordinary (eo) beam. However, these two beams continue to propagate in the same direction. As the optical axis of the second prism is perpendicular to that of the first, the ordinary beam becomes an extraordinary beam at the boundary of the surface. Its refractive index changes from n(o) to n(eo). The opposite applies to the original extraordinary beam, now an ordinary beam; overall, therefore, the two partial beams are refracted onto different directions. A polarization interferometer using a Wollaston prism is, e.g., disclosed in U.S. Pat. No. 4,732,481 to Matsui et al.

When using a so-called Beam Displacing Prism, e.g., a plan-parallely grounded calcite crystal, the incident light beam is separated by the prism under an angle as well; however, the two partial beams are parallel to each other when leaving the crystal.

In both cases, the separation of the incident light beam into two polarized partial beams of perpendicular polarization is fixed due to the geometry and the characteristics of the material and cannot be varied continuously.

Various optical inspection tools used for production and quality control employ such beamsplitters. One example of such a tool is the so-called MIPS (Miniature Interferometric Phase Sensor—U.S. Pat. No. 5,392,116 to Makosch) used e.g., for the quality control of hard disk read/write heads. The characteristics of the slider flying over the rotating hard disk are determined by its aerodynamically shaped underside, the so-called ABS (air bearing surface). The structures of the ABS are set up by various techniques of surface treatment.

The measurement principle of the MIPS is based on phase-shifting laser interferometry. The beam of a laser diode is split by a Wollaston prism into two partial beams which are perpendicularly polarized to each other. An optical system consisting of various optical elements is employed to focus the two laser beams perpendicularly on the object surface. The two laser spots are moved across the object surface by an internal scanner unit, so the surface profile can be measured. The MIPS system is used above all for detection of edges an different ABS pads. The edge's distances are evaluated and have to be compared with pre-set reference values. Deviations from these reference values will lead to a selection of defective sliders. These inspections guarantee the quality of the outgoing read/write heads.

However, when using the MIPS system for other problems, e.g., the interferometric measurement of the etch depth of the ion mill edge of a slider, the distance between the measurement beam and the reference beam has to be adapted. When using a 1° Wollaston prism (i.e., a prism having a separation angle of 1°), due to the optics used, a beam distance on the object surface of about 25 µm will result. However, in order to determine the etch depth, the resulting measurement signal will have to be reworked, i.e, the differential signal will have to undergo a special evaluation procedure, whereby the excellent reproducibility of the MIPS system is at least partially lost.

The necessity of the mentioned special evaluation algorithm and the faults associated therewith are due to the fixed distance of the two laser beams on the surface of the object to be investigated. Referring to the measurement of the etch depth of the ion mill edge of a slider, this means that the second beam (reference beam) already hits the edge before the first beam has left it.

This problem could be overcome by the use of a 2° Wollaston prism leading to a beam distance of about 50 µm. However, due to other measurement problems it will be more useful to maintain the beam distance of 25 µm. Since a quick change between different Wollaston prisms is impossible due to the high requirements with respect to adjustment of the system this solution is more or less impracticable. It also has to be mentioned that this problem is not only associated with the MIPS system, but applies to other measurement systems using such prisms as well.

Also known in the art is the Soleil-Babinet Compensator (SBC). The SBC is a variable, zero-order waveplate which operates in a similar fashion as a conventional net zero-order waveplate set. The SBC uses birefringent materials such as quartz, $MgF_2$, CdS, or CdSe to produce relative retardation between the two transmitted linear polarization components (extraordinary and ordinary beams). The crystallographic-optical axis of the material thereby forms an angle of 0° or 90° with the plan-parallel surfaces of the crystal. The SBC can be used to introduce a desired ellipticity to a beam of polarized light, analyze the polarization state of light, evaluate fixed retardation plates, measure birefringence in optical windows and crystals and the like.

The internal optics consist of a pair of long and short wedges, which are fabricated with identical angles and are subsequently aligned parallel to each other within the SBC. A parallel plate is then added which has its optic axis orthogonal to that of the wedged pair. Retardation of the system is varied by translating the long wedge perpendicular to the beam direction which effectively increases or decreases the net thickness of the wedged pair depending on the direction of the travel. The thickness of the parallel plate is chosen to match the net thickness of the wedged pair near the thin end of the long wedge. Any translation of the long wedge from this net zero retardation position then introduces a net imbalance in the optical pathlengths of the ordinary and extraordinary beams which creates the finite (zero order) retardation.

However, a spatial separation of the two beams is not possible with the SBC and is even unwanted. The crystallographic-optic axes of the two wedges are arranged perpendicular to the direction of the incident light beam to avoid a spatial separation of the ordinary and the extraordinary beam. Thus, the SBC is not a beamsplitting optical element but a variable phase retardation plate.

Accordingly, the prior art does not provide for a variable lateral separation of the produced ordinary and extraordinary beam.

SUMMARY OF THE INVENTION

A polarizing beamsplitter according to one embodiment allows the user to vary the lateral spacing of two partial beams emerging from the beamsplitter. The beamsplitter includes two wedge-shaped prisms of a birefringent material, the prisms forming a plan-parallel plate. An incident light beam entering the beamsplitter is separated into two partial beams that emerge from the beamsplitter. The partial beams have a lateral distance with respect to each other, characterized in that the lateral distance is continuously changeable by adjusting various parameters of the beamsplitter, as set forth below.

The birefringent material can be an optically uniaxial or biaxial material. Illustrative optically uniaxial materials include quartz, calcite corundum, nitrate of sodium, turmaline, beryl and the like.

The two wedge-shaped prisms can be formed by slicing a plan-parallel crystal under a desired prism angle. In a preferred embodiment, the crystallographic-optic axes of the prisms have the same orientation within both wedge-shaped prisms, and wherein the orientation is different from 0° or 90°, e.g 45°, with respect to the surface of incidence.

The lateral distance is changeable by, varying an optical pathlength the partial beams follow across the beamsplitter. For instance, the optical pathlength can be varied by shifting the two prisms with respect to each other, such as along a common edge. The two prisms can also be shifted with respect to each other in such a way that a planparallel gap is formed between the two prisms. Preferably the two prisms are shifted with respect to each other along, a geometric-optical axis of one of the prisms.

The lateral distance of the emerging partial beams can be symmetric with respect to the incident beam. A plan-parallel plate can be arranged behind the beamsplitter for creating the symmetric spacing of the lateral distance with respect to the incident beam.

The polarizing beamsplitter can be used for scanning a surface of an object.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The present invention provides a polarizing beamsplitter where the separated partial beams are perpendicularly polarized and having the following essential features:

1. After leaving the beamsplitter the two partial beams run parallel to each other and parallel to the direction of the beam incidenting into the beamsplitter (geometric-optical axis of the overall system); and
2. The distance between the two emergent partial beams can be variably adjusted and can thus be varied dynamically.

The system according to one embodiment comprises two birefringent prisms or crystal wedges, formed e.g., from calcite, quartz or the like, which are either in direct contact with each other or may be arranged within a distance D from each other. When the two prisms are in contact with each other an "index matching fluid" may be applied between them. Thus, reflection losses between the prisms can be reduced. In addition, such a fluid may change the direction of the beams in a desired way.

In principle, different kinds of birefringent material can be used. However, optically uniaxial crystals like calcite, corundum, nitrate of sodium, turmaline, beryl and the like are preferred.

Together, both prisms form a plan-parallel plate and the crystallographic-optic axes of the two prisms have the same orientation with respect to each other.

Figure 1:
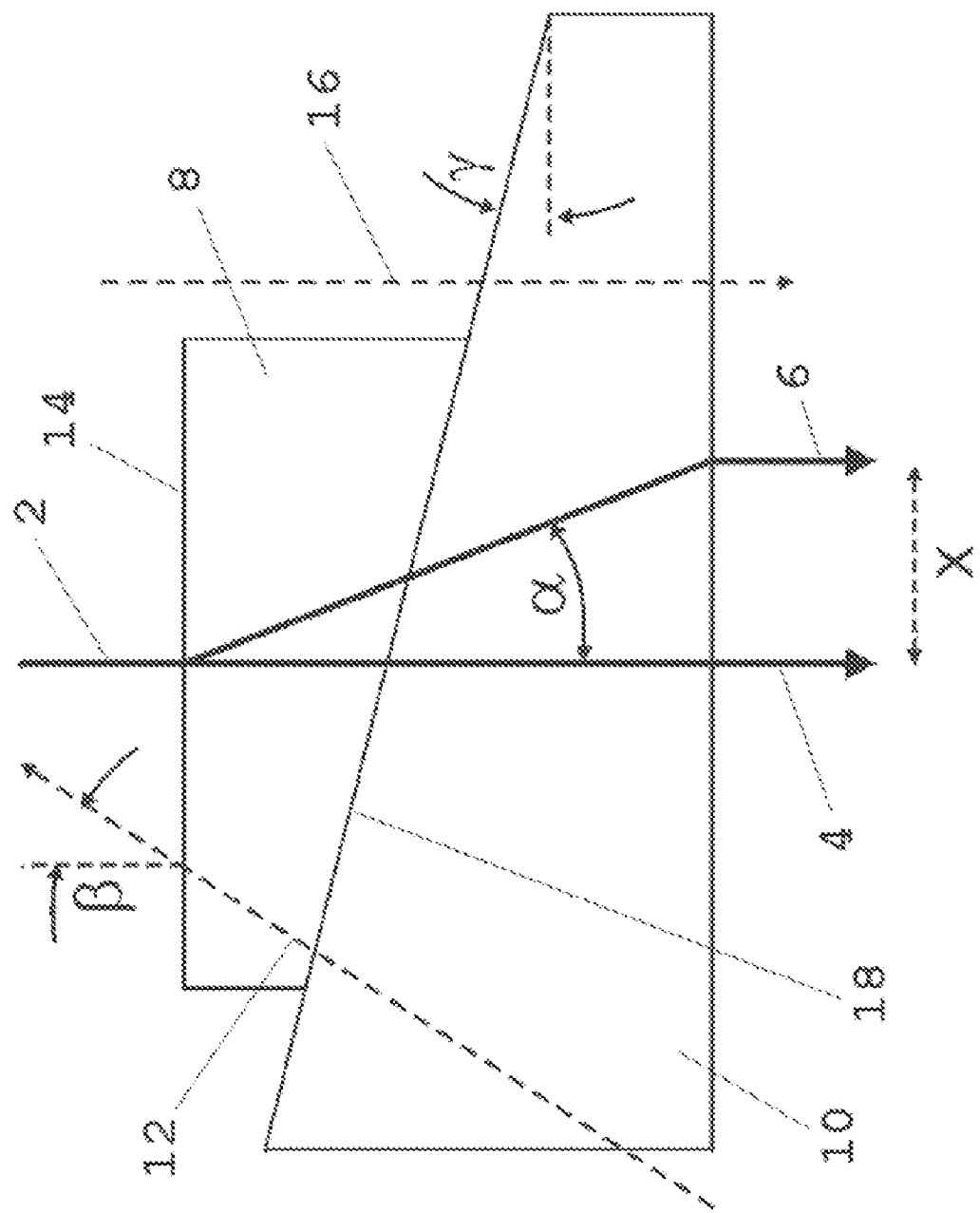
FIG. 1 is a schematic view of the beamsplitter according to the invention with the indication of the optical axes of the crystal wedges.

FIG. 1 shows the two partial beams 4, 6, derived from an incident beam 2, forming an angle α when propagating through the prisms 8, 10 and running in parallel when leaving prism 10, the lateral distance between the beams being designated as x. In FIG. 1, beam 4 represents the ordinary and beam 6 the extraordinary beam. Also shown is the geometric-optical axis 16 of the device, in this case chosen parallel to the incident beam 2 and perpendicular to the surface of incidence 14.

As can also be seen from FIG. 1, the invention can be realized by first slicing a plan-parallel crystal, e.g., calcite, into two wedge shaped prisms 8 and 10 within a desired prism angle γ, e.g., between 0° and 90°. The cut edge is indicated in FIG. 1 as 18. Subsequently, the cut edges are polished. It has to be noted that the crystallographic-optical axis 12 of the material thereby lies within an angle β with respect to the plan-parallel surfaces of the crystal, this angle β being different from 0° and 90° respectively. When using calcite, an angle in the range of about 45° is especially advantageous since in this case, a maximum splitting of the two beams will be achieved. The splitting depends on the ordinary and the extraordinary indexes of refraction of the respective material. The angle where the splitting is maximal is defined by the equation $$\Theta_{max} = \arctan(n_e/n_o) \tag{1}$$

where (in a uniaxial material) $n_o$ and $n_e$ are the two different elements of the dielectric tensor. The angular separation of the extraordinary beam in the birefringent material is called "walk-off" and has to be taken into account when using birefringent materials. The walk-off angle α for $\Theta_{max}$ is defined by the following equation:

$$\tan\alpha = \frac{1(n_e^2 - n_o^2)\sin 2\Theta}{2n_e^2\cos^2\Theta + n_o^2\sin 2\Theta} \tag{2}$$

or, when using n(Θ):

$$\tan\alpha = \frac{n^2(\Theta)}{2}\left(\frac{1}{n_o^2} - \frac{1}{n_e^2}\right)\sin 2\Theta \tag{3}$$

When using quartz as the birefringent material, $\Theta_{max}=45.2°$, and using this value, the walk-off angle is calculated to be α=0.53°. When using calcite, the walk-off angle will be about 6.2°. The walk-off angle α between the two partial beams 4, 6 is shown in FIG. 1.

When using calcite as the birefringent crystal, and the orientation β of the crystallographic-optical axis 12 as shown (FIG. 1), a light beam incidenting on the crystal is divided into the ordinary and the extraordinary beam being perpendicularly polarized. The extraordinary beam, when hitting the first crystal surface 14 of prism 8, undergoes a deviation of α=6.2° (when using a wavelength of 633 nm, since the deviation angle also depends on the wavelength of the light used); due to an opposite deviation of the same value, it leaves the prism 10 parallely offset to the incident beam.

The lateral distance x between the extraordinary beam 6 thus deviated and the ordinary beam 4, which, due to its polarization, propagates through the prisms undeviated, depends on the crystal length L and the deviation angle which, in turn, depends on the material, the orientation β of the crystallographic-optical axis 12, and the wavelength used. For the beam separation, the following equation applies:

$$x = L \cdot \tan\alpha \tag{4}$$

Figure 2:
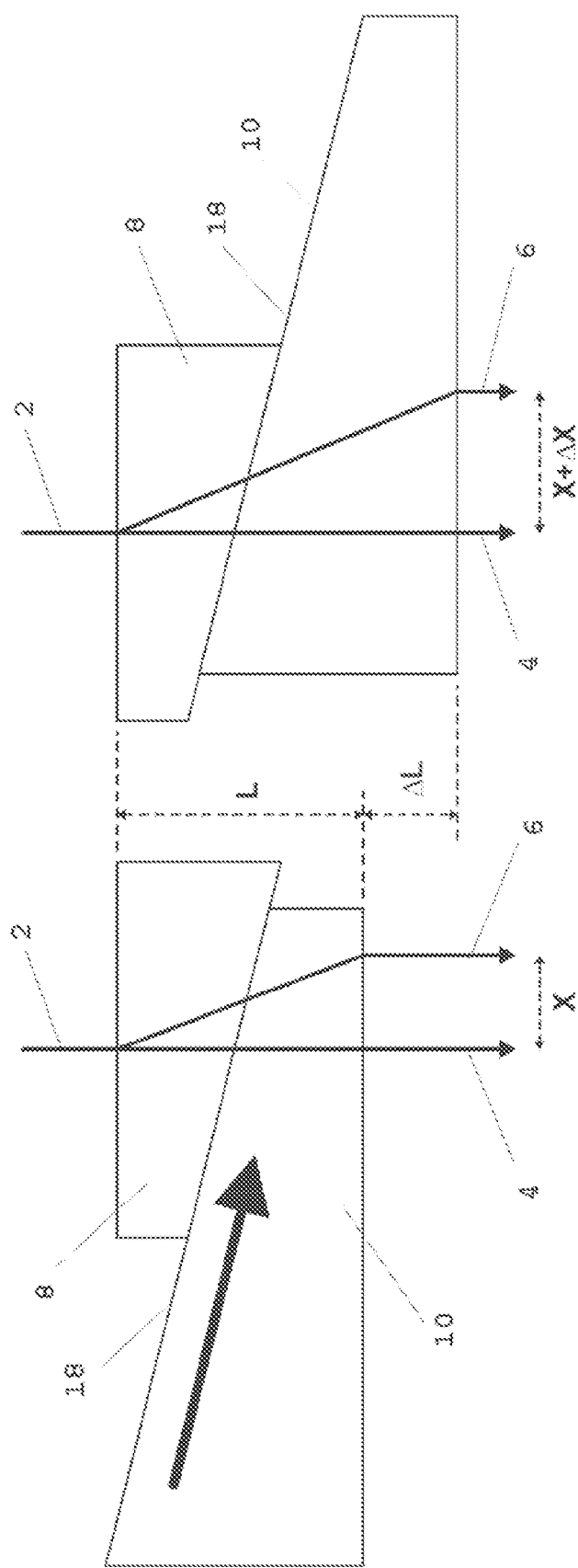
FIG. 2 is a schematic view of the movement of the wedges against each other for the generation of a change of material thickness.

In order to achieve a variable beam separation, the crystal length L is varied as shown in FIG. 2. This can be achieved by a translation of the prisms 8, 10 relative to each other along the cut edge 18 as shown by the arrow in FIG. 2. In this way, the distance L which the light has to travel in the prism system can be varied. Due to the birefringence, the incident light beam is divided into two partial beams: the ordinary beam 4 travels through the prism system within an angle of 0° whereas the extraordinary beam 6 travels within an angle α, which, as has already been described before, depends on the material used, the wavelength of the incident beam and the orientation β of the crystallographic-optical axis 12 (FIG. 1).

The lateral separation x+Δx of the two partial beams when leaving the prism system follows the following equation:

$$x + \Delta x = (L + \Delta L) \cdot \tan\alpha \tag{5}$$

Due to the parallelism of the partial beams, this lateral separation is preserved after the partial beams have passed the beamsplitter.

The minimal lateral separation x(Δx=0) depends on the crystal size. The possible range of ΔL and therefore Δx depends on the prism angle γ. The crystal size and γ have to be chosen in a way that the range of possible lateral separations x+Δx fits the requirements of a given problem.

Figure 3:
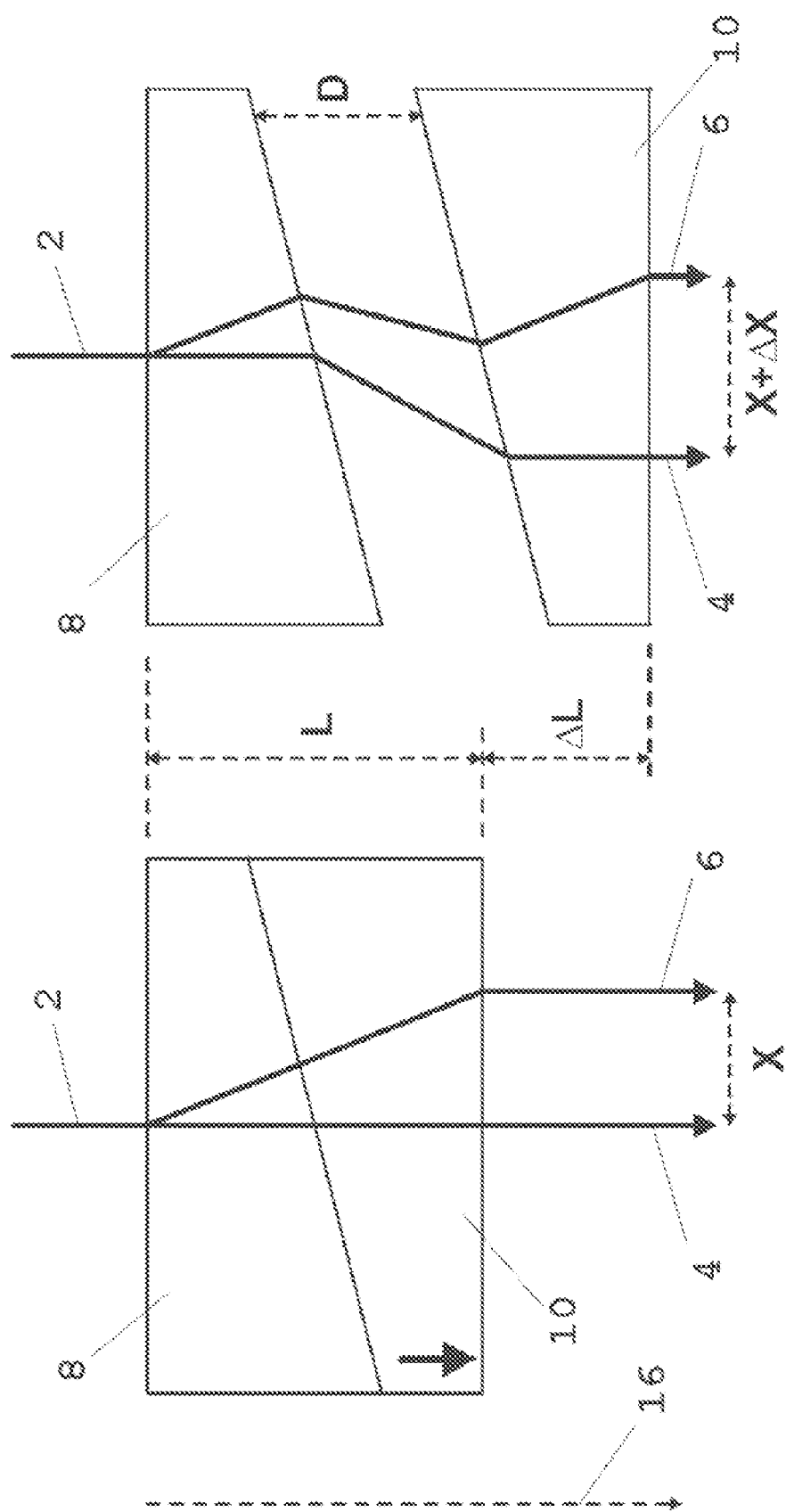
FIG. 3 is a schematic view of the movement of one of the wedges parallel to the geometric-optical axis for the generation of a variable beam separation.

A second embodiment of the present invention is shown in FIG. 3. By translating the prisms 8, 10 relative to each other along the geometric-optical axis 16 of the system (cf. the arrow in FIG. 3), a plan-parallel gap D is formed between the two prisms. This as well leads to a variable lateral separation x of the two partial beams which again leave the second prism 10 parallel to each other. In contrast to the embodiment shown in FIG. 2, the position of the ordinary beam 4 is changed as well, since the beam is also deviated within the gap D.

The described variable beamsplitter with variable beam separation allows for continuously varying the position of the extraordinary beam (FIG. 2) and the position of both the extraordinary and the ordinary beam (FIG. 3) by shifting the two wedge-shaped prisms with respect to each other and thus varying the distance L the two beams have to travel. Thus, these systems can also be used for scanning the extraordinary beam or both beams leaving the prism system.

Figure 4:
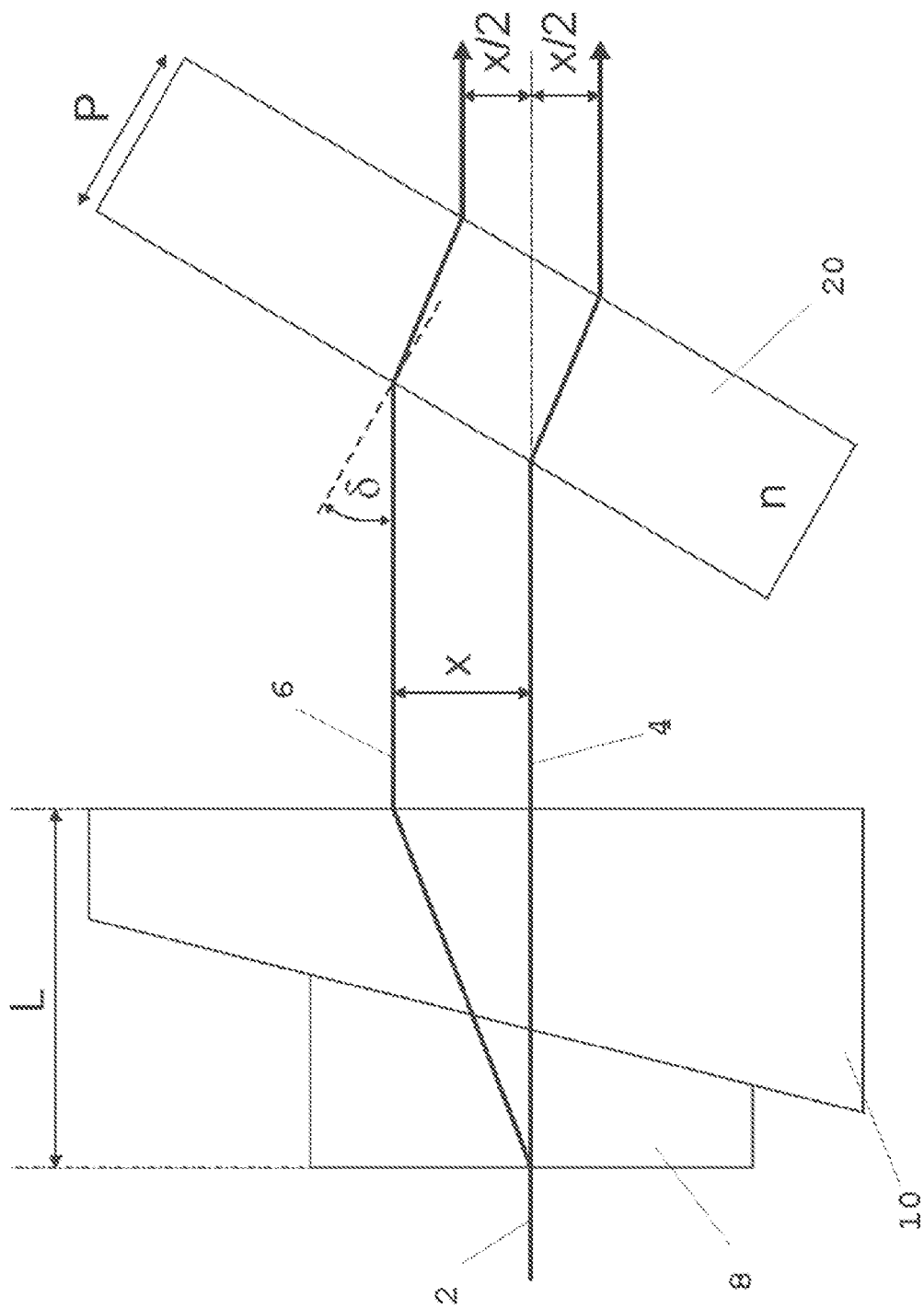
FIG. 4 schematically shows an arrangement for achieving a symmetric splitting of the partial beams around the geometrical-optical axis of the beamsplitter according to the invention.

It may be advantageous to achieve a substantially symmetric splitting around the geometric-optical axis of the prism system. This can be achieved by means of a pivotable plan-parallel plate 20 having a thickness P and being made of a material having the refractive index of n, as shown in FIG. 4. For the lateral beam offset d introduced by the plate the following equation is valid:

$$d = P \cdot \sin\delta\left[1 - \sqrt{\frac{1 - \sin^2\delta}{n^2 - \sin^2\delta}}\right] \tag{6}$$

For small rotating angles δ of the plate the following equation is valid:

$$d = \frac{P \cdot \delta \cdot (n-1)}{n} \tag{7}$$

For the symmetric orientation of the two beams with reference to the optical axis the following equation applies:

$$d = \frac{x}{2} \tag{8}$$

Figure 5:
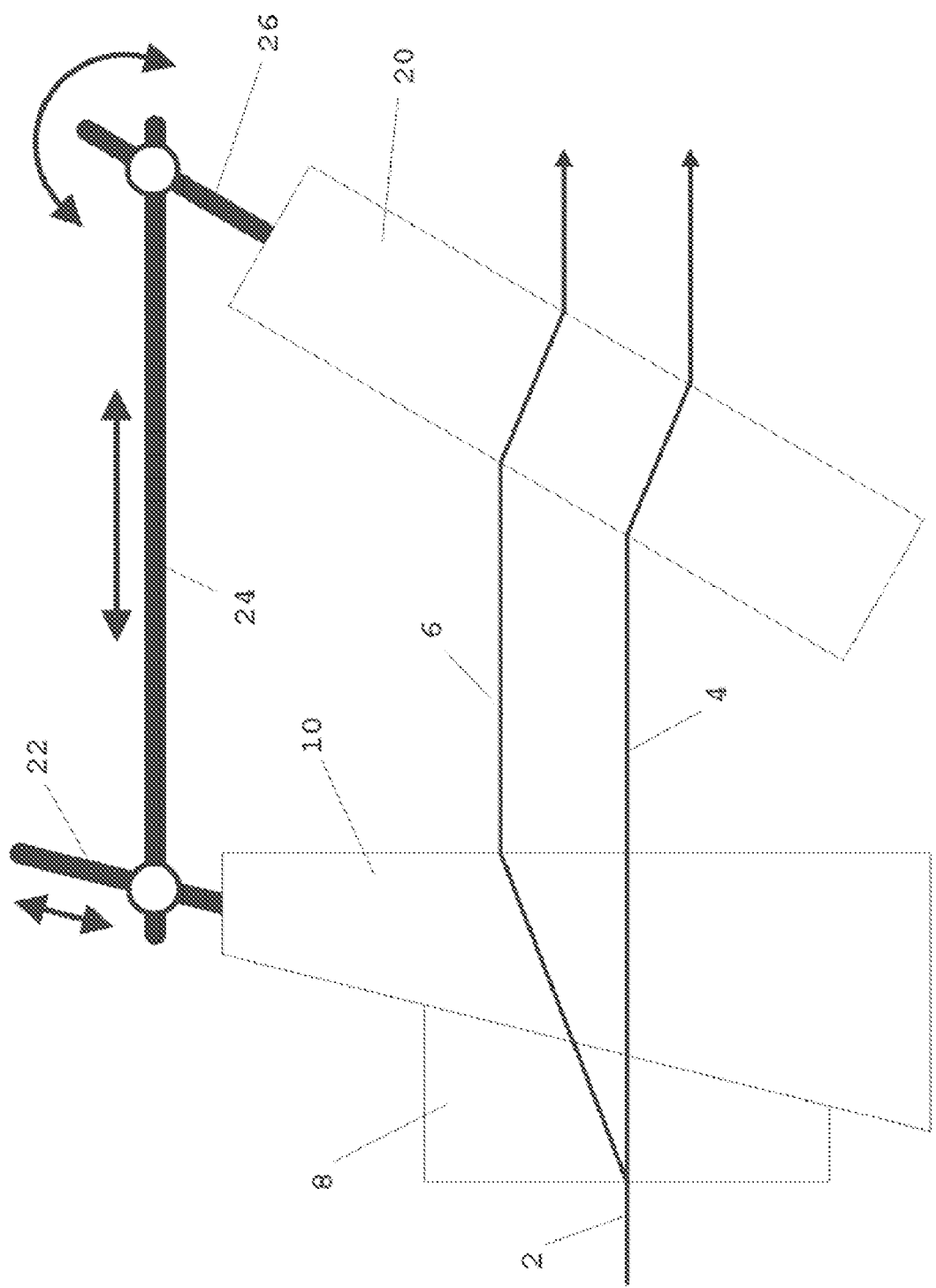
FIG. 5 schematically shows a special embodiment of the arrangement of FIG. 4.

The principle of the combined shifting of the wedges and the pivoting of the plate 20 of the solution shown in FIG. 4 can be achieved by a spindle mechanics as shown in FIG. 5. The second prism 10 is shifted by means of a shifting device like, e.g., a micrometer screw, piezo actuator 22 or the like. The plan-parallel plate 20 is arranged pivotably around an axis orthogal to the plane of projection in FIG. 5. By means of a spindle 24 or the like, the micrometer screw 22 is coupled to a threaded rod 26 which is attached at the plate 20.

By choosing a respective gear ratio of the coupling mechanics, the requirement as to a symmetric, orientation of the ordinary and the extraordinary beams (equation (8)) can be achieved for a special set of parameters (birefringent material, effective length L, material and thickness P of the plan-parallel plate).

Figure 6:
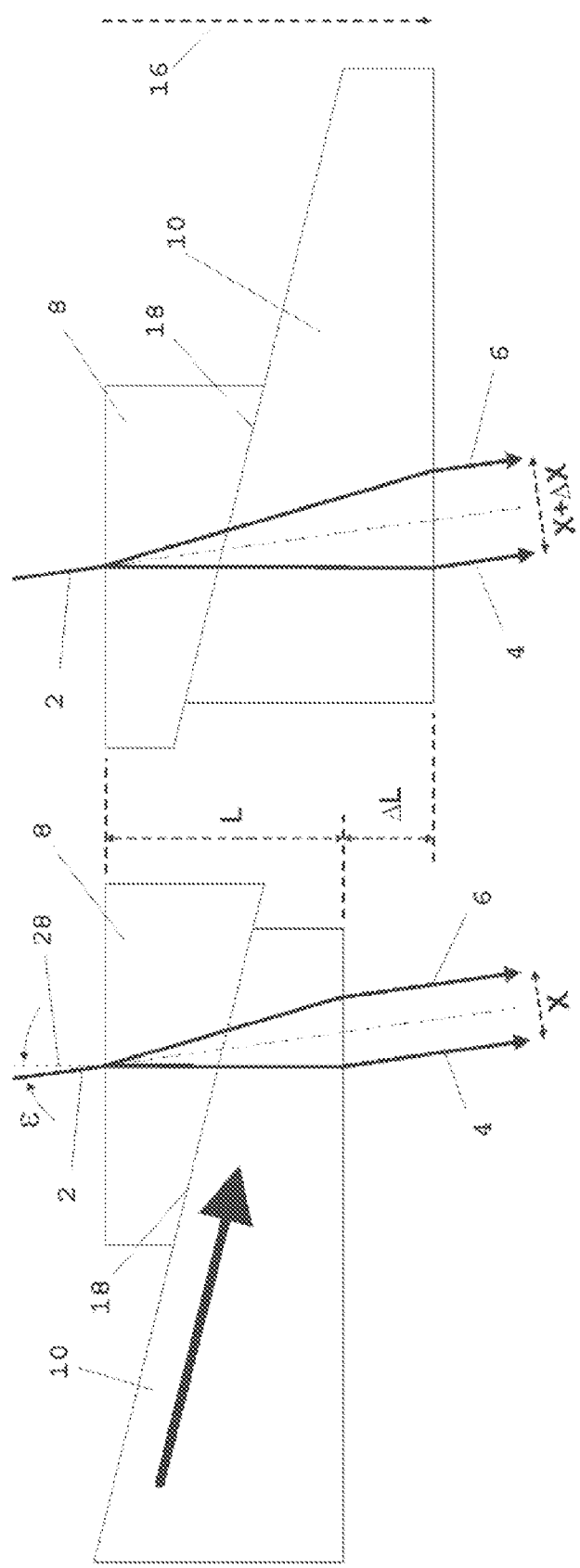
FIG. 6 is a schematic view of the beamsplitter where the two refracted beams are separated symmetrically relative to the direction of the incident beam.

Another embodiment to achieve a symmetrical beam separation is shown in FIG. 6. In this case the incident beam 2 is no longer perpendicular to the surface of incidence 14. The angle ϵ between incident beam 2 and surface-normal 28 is chosen so that the ordinary beam 4 and the extraordinary beam 6 are refracted symmetrically in the prism material with respect to the direction of the incident beam. For calcite wedges with the orientation β of the crystallographic-optical axis 12 as shown (FIG. 1), this angle ϵ is about 8°.

In order to achieve a variable beam separation, the crystal length L is varied as shown in FIG. 6. This can again be achieved by a translation of the prisms 8, 10 relative to each other along the cut edge 18 as shown by the arrow in FIG. 6. The angle ϵ depends on the material used, the wavelength of the incident beam and the orientation β of the crystallographic-optical axis (FIG. 1).

Figure 7:
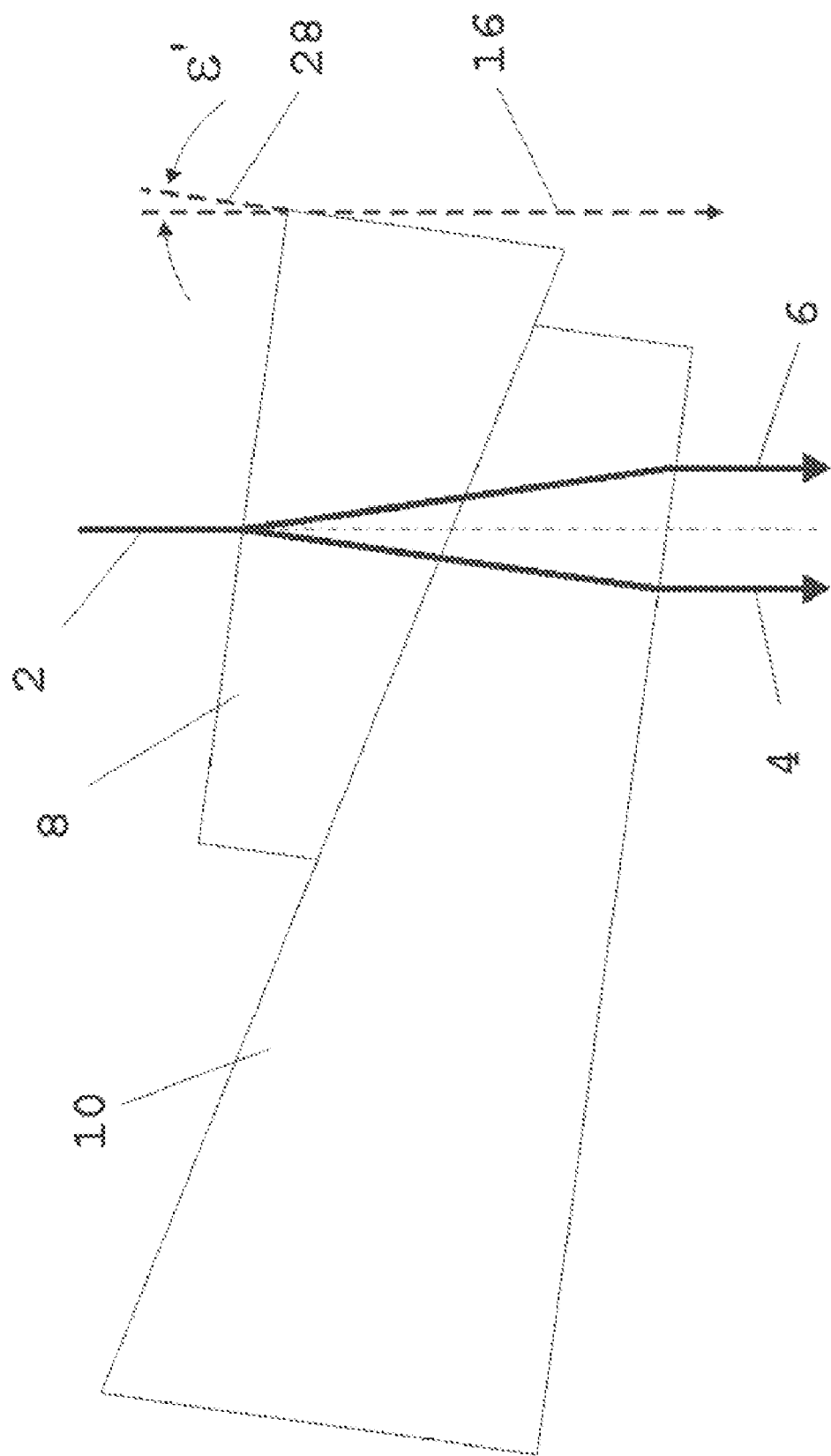
FIG. 7 is a schematic view of the beamsplitter with symmetrical beam separation with the complete system being rotated.

To maintain the parallelism between the beams 2, 4, 6 and the geometrical optic axis 16 of the system one would normally rather rotate (pivot) the wedges 8, 10, than change the direction of the incident beam 2. This function is shown in FIG. 7. The angle that the wedges need to rotate is $\epsilon^6 = -\epsilon$ (FIG. 6).

The beamsplitter of the present invention can also be used in a scanning device.

Many optical measuring methods are based on scanning techniques of the objects to be investigated in contrast to the so-called imaging methods. Scanning of a surface with light beams, e.g., laser beams of the measuring device is achieved by:
1. Excursion of the light beams within the optical measuring system by e.g., deviating a planparallel glass plate or by rotating of deviation mirrors;
2. Shifting the object to be investigated below the fixed measuring system by means of e.g., a piezomechanical device or the like.

Furthermore, several measuring systems use a so-called common-path configuration, where both the measuring beam and the reference beam travel nearly identical distances within the system and hit laterally deviated points of the object surface. The measuring system then determines the height difference between these two points. By means of scanning the surface of the object with both partially beams, the differential profile of the surface can be measured.

One major advantage of the common-path interferometers resides in their stability with respect to disturbances from outside, e.g., variations of the refractive index or ambient temperature, vibrations etc,. However, a great disadvantage of these systems is, as already mentioned, that differential scanning of the surface profile requires a rework of the data.

The beamsplitter according to the invention offers a new scanning concept by making use of the fact that the beam passing the variable beamsplitter without any deviation (ordinary beam) is used as a reference beam being stationary on the surface of the object.

By shifting the wedges and by thus increasing the distance between the ordinary and the extraordinary beam, the extraordinary beam serving as a measuring beam is shifted with respect to the reference beam and is thus moved over the surface of the object to be investigated.

This method has the advantage that the reference beam is fixed at an invariable position and only the measuring beam is moved over the surface. Referring to the example of measuring the etch depth of an ion mill edge by means of the MIPS, this means that the laterally extended edge profile can be scanned completely by the measuring beam only. Accordingly, a direct, i.e., a non-differential profile of the surface is achieved.

Applying the variable beamsplitter in a scanning method thus, on the one hand, offers the advantages of a common-path interferometric method (stability with respect to fluctuations of ambient air, vibrations of all kind, etc.) and on the other hand, circumventing the respective disadvantages (differential surface profiles, rework of data, etc.).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A polarizing beamsplitter, comprising:
   two wedge-shaped prisms of a birefringent material, the prisms forming a plan-parallel plate,
   wherein an incident light beam is separated into two partial beams emerging from the beamsplitter, the partial beams having a lateral distance with respect to each other,
   wherein the lateral distance is continuously changeable.

2. The polarizing beamsplitter according to claim 1, wherein the birefringent material is an optically uniaxial material.

3. The polarizing beamsplitter accordingly to claim 2, wherein the optically uniaxial material is chosen from the group consisting of quartz, calcite, corundum, nitrate of sodium, turmaline, and beryl.

4. The polarizing beamsplitter according to claim 1, wherein the birefringent material is an optically biaxial material.

5. The polarizing beamsplitter according to claim 1, wherein the two wedge-shaped prisms have been formed by slicing a plan-parallel crystal under a desired prism angle.

6. The polarizing beamsplitter according to claim 1, wherein the crystallographic-optic axes of the prisms have the same orientation within both wedge-shaped prisms, and wherein the orientation is different from 0° or 90° with respect to the surface of incidence.

7. The polarizing beamsplitter according to claim 6, wherein the orientation is about 45° with respect to the surface of incidence.

8. The polarizing beamsplitter according to claim 1, wherein the lateral distance is symmetric with respect to the incident beam.

9. The polarizing beamsplitter according to claim 8, further comprising a plan-parallel plate arranged behind the beamsplitter for creating the symmetric spacing of the lateral distance with respect to the incident beam.

10. The polarizing beamsplitter according to claim 1, wherein the beamsplitter is used for scanning a surface of an object.

* * * * *